United States Patent Office 3,108,088
Patented Oct. 22, 1963

3,108,088
RESINOUS COMPOSITIONS COMPRISING A STYRENE POLYMER AND AN ALDEHYDE MODIFIED INTERPOLYMER OF AN ACID AMIDE AND A VINYL MONOMER AND ARTICLES COATED THEREWITH
Robert C. Krueger, Whitefish Bay, Wis., assignor to Pittsburgh Plate Glass Company, Pittsburgh, Pa., a corporation of Pennsylvania
No Drawing. Filed Nov. 16, 1960, Ser. No. 69,542
12 Claims. (Cl. 260—45.2)

This invention relates to resinous compositions and more particularly, it relates to resinous coating compositions characterized by freedom from solvent popping.

In a copending application, Serial No. 749,583, filed July 21, 1958, now U.S. Patent 3,037,963, there is disclosed a process for producing useful resinous products from unsaturated carboxylic acid amides, such as acrylamide or methacrylamide. The process disclosed in said copending application involves forming an interpolymer of such unsaturated carboxylic acid amides with at least one other polymerizable ethylenically unsaturated monomer, and then reacting said interpolymer with an aldehyde such as formaldehyde, preferably in the presence of an alcohol such as butanol. The resulting resins range from soft, flexible materials to very hard solids, depending upon the choice of monomers utilized in preparing the amide interpolymer which in turn is reacted with the aldehyde and optionally with the alcohol.

It is also disclosed in said copending application that the foregoing interpolymers can be advantageously combined with other resinous materials, including epoxide resins, fatty acid esters containing an epoxy group, vinyl resins, alkyd resins, amine resins and the like, to give many outstanding properties, including excellent flexibility, excellent gloss, color retention, moisture resistance, stain resistance, grease resistance, heat resistance, detergent resistance, corrosion resistance, and many other useful properties. As such, they are particularly valuable in protective coating compositions, for example, as appliance finishes and, in general, as excellent coatings for metallic surfaces.

Coating compositions prepared utilizing an interpolymer of a polymerizable carboxylic acid amide as described in the foregoing paragraph either as the sole resinous component or in combination with other resinous materials, suffer from the disadvantage that they are often subject to considerable "solvent popping." Solvent popping manifests itself in the form of bubbles or pinholes in the cured film surface and, in general, destroys the otherwise pleasing appearance of the film.

The exact cause of solvent popping is not known, but two theories have been advanced. The first is that the film sets up structurally, or actually begins to cross-link before the last portion of the solvent, for example, the last one-half percent, is eliminated. This residual solvent cannot evaporate through the tough surface film, and collects in tiny bubbles which may or may not rupture the film, depending upon the curing conditions. This is believed to be the more accurate theory of solvent popping.

The second theory is that as the resin cures, the water and/or alkanol given off during the cross-linking cure process is actually entrained under the film surface in the form of tiny bubbles in much the same way as a solvent would be.

It has now been found that the more compatible polystyrene and poly(alpha alkyl)styrenes, particularly the lower alkyl derivatives (methyl and ethyl), can be used to eliminate solvent popping by incorporating them in limited quantities (about 3 percent by weight) with the amide interpolymers. Because they are extremely compatible with the unsaturated carboxylic acid amide interpolymers, they may be more easily and universally employed with the said amide interpolymers and provide for a much more economical system for production methods. In addition to eliminating problems of solvent popping, polystyrenes and poly(alpha alkyl)styrenes tend to substantially improve the mar resistance of the film.

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

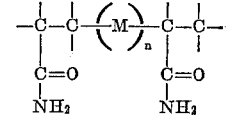

wherein M represents a unit of a monomer polymerizable with acrylamide, and $n$ represents a whole number greater than 1. For example, if styrene were utilized as the second monomer, M would represent the unit

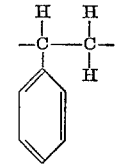

The short chain interpolymer then reacts with an aldehyde, as represented by formaldehyde, to give the structure

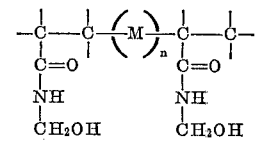

wherein M and $n$ have the significance set forth hereinabove.

In the event the aldehyde is utilized in the form of a solution in butanol or other alkanol, etherification will take place so that at least some of the methylol groups in the above structure will be converted to groups of the structure

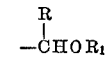

wherein R is selected from the class consisting of hydrogen and a saturated lower aliphatic hydrocarbon radical having its free valences on a single carbon atom, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed, as may aromatic alcohols, such as benzyl alcohol, or cyclic alcohols. Other hydroxyl substituted compounds, such as the reaction products of alkylene glycols with certain alkanols, particularly the ethylene glycol series; the latter are better known as the Cellosolves. Methyl through amyl Cellosolve are readily employed in the etherification.

While either acrylamide or methacrylamide is preferred for use in forming the interpoymer component, any unsaturated carboxylic acid amide can be employed. Such other amides include itaconic acid diamide, alphaethyl acrylamide, crotonamide, fumaric acid diamide, maleic acid diamide, and other amides of alpha, betaethylenically unsaturated carboxylic acids containing up to about 10 carbon atoms. Maleuric acid, and esters thereof, and imide derivatives, such as N-carbamyl maleimide, may also be utilized.

Any polymerization monomeric compound containing at least one $CH_2=C<$ group may be polymerized with the unsaturated carboxylic acid amide. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-propene-1, 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-trimethyl-pentene-1, 2,3,4-trimethyl-penetene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloro-monofluorostyrenes, 2-chloro-propene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,1,2,2,-tetrachloroethylene, 1-chloro-2,2,2-trifluoroethylene, chlorobutadiene and other halogenated diolefinic compounds;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethyl hexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, viny alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-buten-4-ol, 2-methyl-butene-4-ol, 2(2,2-dimethylpropyl)-1-buten-4-ol, and 1-pentene-4-ol;

Methyl alpha-chloroacrylate, methyl apha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyanoacrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like.

In carrying out the polymerization reaction a free radical initiating type catalyst, particularly a peroxygen compound, is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of amide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization of the very rapid reaction rate and because the reaction is highly exothermic. Some control of the heat of reaction is obtained by adding the acrylamide to the polymerization mixture incrementally. Good agitation is also desirable.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer is described in detail in U.S. Patents 2,870,116 and 2,870,117, the disclosure of which is incorporated herein by reference.

The amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine is greatly preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amine group in the interpolymer, or as low as about 0.2 equivalent of formaldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. Alkaline catalysts, such as sodium hydroxide, potassium hydroxide, hexamethylenetetramine, and other basic amines may also be utilized. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation, as may a portion of the solvent is desired. In fact, when the aldehyde is utilized in the form of a solution in an alkanol such as butanol, it is desirable that approximately half of the butanol be distilled off at the end of the reaction period and replaced by another solvent, such as xylol. It is preferred that the final resinous material have a solids content of about 20 percent to 70 percent.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application, Serial No. 775,380, filed November 21, 1958, does not require reaction of the polymer with an aldehyde since the N-alkoxyalkyl amide monomers already contain —ROH or

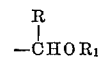

groups, wherein R and $R_1$ have the meaning set forth above.

Regardless of the method by which the resinous material is obtained, it will contain in the polymer chain recurrent groups of the structure

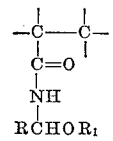

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction.

As disclosed hereinabove, the unsaturated carboxylic acid amide interpolymer resins can readily be combined with many other resinous materials to form useful compositions. In fact, one important advantage of the carboxylic acid amide interpolymers prepared in the manner described hereinabove is the unusually good compatibility they exhibit with other resins. Such other resins include:

*Epoxide resins.*—These resins are polyglycidyl ethers of polyhydric compounds and are preferably polyglycidyl ethers of dihydric phenols, having as their sole functional groups epoxy and hydroxy groups. A representative epoxide resin structure may be illustrated as follows:

the amide interpolymers may also be blended with other resinous materials including amine resins, such as urea-formaldehyde resins, or melamine-aldehyde resins, silicone resins, polyvinyl acetal resins, nitrocellulose and the like.

The particular polymer of styrene which is to be used to eliminate solvent popping is not limited as to molecular weight or structure. However, as the molecular weight of the styrene increases, the proportion which can

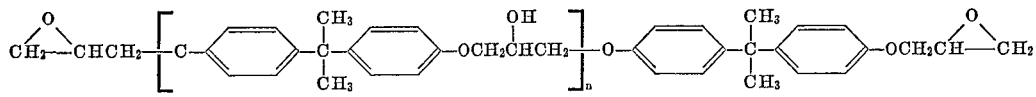

In the foregoing structure, n is a number of a magnitude dependent upon the degree to which the etherification is carried. The epoxy resins are frequently characterized by molecular weight, and it has been found that those epoxy resins possessing the molecular weight above about 200, and preferably about 700 to 2000 are most suitable for combining with interpolymers of acrylamide. However, the epoxy resins having other molecular weights may also be utilized.

When an epoxy resin is blended with the amide interpolymers, amounts as low as about 5 percent by weight of the epoxy resin can be utilized, as can amounts as high as 40 percent or more of the epoxy resin. Preferably, the epoxy resin is utilized in an amount of about 10 percent to about 20 percent.

*Vinyl resins.*—These resins are polymers of a vinyl halide and include homoploymers such as polyvinyl chloride or polyvinyl bromide, as well as copolymers of a vinyl halide with a vinylidene compound or a vinyl ester, such as vinyl acetate or the like. The preferred vinyl halide polymers are those which are polymers of vinyl chloride, vinyl acetate and a small portion of an unsaturated dicarboxylic acid, such as maleic acid or fumaric acid. One particularly preferred resin contains approximately 86 percent vinyl chloride, approximately 12 percent of vinyl acetate, and approximately 1 percent of maleic acid. The vinyl resin can be blended with the amide interpolymer resin over extremely wide ranges. For example, either resin can be used in an amount of about 5 percent to 95 percent of the resin components, although preferably the vinyl resin is employed in an amount of about 5 percent to 75 percent by weight.

*Epoxidized oils.*—These materials may also be described as epoxy fatty acid esters in which the higher fatty acid group contains an epoxy group. They are ordinarily obtained by the reaction of peracetic acid with an ester of a higher fatty acid, the fatty acid group containing about 8 to 22 carbon atoms. The quantity of fatty acid epoxide ester which is blended with amide interpolymer may also be varied considerably. For example, amounts as low as about 5 percent by weight may be used, as may amounts as high as about 50 percent or more by weight of the fatty acid epoxy ester.

*Alkyd resins.*—These resins are reactive products of dicarboxylic acids or anhydrides with polyols and preferably the oil modified types, such as those derived from linseed oil, coconut oil, cottonseed oil, tall oil and castor oil. It has been found that those alkyd resins having a short oil length and a relatively high hydroxyl number or high carboxyl number are more readily compatible with the acrylamide interpolymers than are alkyd resins having a low hydroxyl or low carboxyl value. The proportions in which the amide interpolymer and the alkyd resin are admixed are not critical; however, the most useful compositions are obtained when the components are blended in amounts such that there is present about 25 percent to 95 percent of the amide resin and about 5 percent to 75 percent of the alkyd resin.

In addition to the foregoing preferred modifying resins, be added becomes less. Such polymers are prepared from monomers ordinarily of the structure:

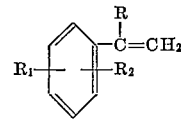

wherein R, $R_1$ and $R_2$ represent at least one member of the group consisting of hydrogen, methyl, ethyl, propyl and butyl radicals. Because of their low cost, polystyrene itself and poly(alpha methyl)styrene are the preferred polymers. These polymers are generally of a non-crystalline structure when subjected to X-ray analysis; however, most crystalline styrenes and poly(alpha methyl)styrenes which are prepared through an ionic catalysis, such as through the utilization of the well-known "Ziegler-Nata catalyst," may also be used advantageously with the present invention. The polymers of styrene, in general, may be prepared by the well-known process of heating in bulk an agitated mass of the monomer and subsequently devolatilizing the unreacted monomer. Reference is made to a text on Styrenes and Substituted Styrenes by Boundy-Boyer, Reinhold, New York, New York, 1952, for a more detailed and complete disclosure on the preparation of the polymers thereof. In addition to homopolymers of styrene and alpha-alkyl styrene, copolymers thereof with other monomers containing a $CH_2=C<$ group may also be utilized to prevent solvent popping. In such styrene copolymers, the styrene should be the major component (at least 90 percent of the monomer content so that the properties of the polymer of styrene are not significantly altered to become inoperative. These copolymers are included in the expression "polymer of styrene" as employed herein.

Various comonomers which may be copolymerized with the various styrenes in amounts up to 10 percent of the polymer unit may be taken from the aforementioned list of compounds which include the olefinic hydrocarbons of group (1), the halogenated olefinic hydrocarbons of group (2), the various alkyl esters of group (3) and the organic nitriles of group (4).

The polymer of styrene is incorporated into the resinous composition in one of several convenient ways. By one method a hot solution of the polymer, particularly the more viscous, is prepared in a solvent, such as xylene, and the resultant hot solution is added to this coating composition with vigorous agitation in order to avoid crystallization and seed formation in the coating composition. A second method also involves forming a hot solution of the styrene polymer and xylene or other solvent and cooling the solution to form the gel. The resulting gel is then ground with a pigment into the coating composition. The polymer of styrene is dispersed in either of the above manners, no difficulty with polystyrene separation is encountered. Other methods of dispersing polymers of styrene can also be employed. A less viscous polymer of styrene can be incorporated by merely blending the resin solvent, etc. in the "let down" of the already pigmented enamel, etc.

The quantity of polymer of styrene which is employed to prevent solvent popping may be varied over a wide range. For example, it has been observed that amounts as low as 0.3 percent have a substantial effect on minimizing solvent popping, and on the other hand, amounts as high as about 25 percent by weight of the resinous composition components can be employed. It is preferred, however, that the polymer of styrene be employed in amounts ranging from about 1 to about 20 percent. In reality, there is no maximum amount of the polymer of styrene which will detract from the appearance of the film because of the unlimited compatibility of polymer of styrene with the unsaturated carboxylic acid amide interpolymers. There is no decrease in gloss as the polymer of styrene is increased in concentration, and there is no problem of compatibility in the use of any of the polymers of styrene and alpha alkyl styrene with any of the aforementioned unsaturated carboxylic acid amide interpolymers.

The following examples illustrate the preparation of unsaturated carboxylic acid amide interpolymers containing

groups substituted for hydrogen atoms of the amido groups, as well as the preparation of blends of the said interpolymers with polystyrenes and poly(alpha alkyl)-styrenes with or without the addition of other resinous materials. The following examples are given by way of illustration and not by way of limitation. All parts and percentages are given by weight unless otherwise specified.

*Example I*

An interpolymer was prepared from a mixture of the following materials:

| | Parts by weight |
|---|---|
| Styrene | 40 |
| Ethyl acrylate | 45 |
| Acrylamide | 15 |
| Cumene hydroperoxide | 1 |
| Tertiary dodecyl mercaptan | 1 |

The above components were refluxed in butanol for about 6 hours. The resulting product was then admixed with 2 moles of formaldehyde in the form of a 40 percent solution in butanol, and the mixture refluxed for an additional 3 hours. One-half of the butanol was then removed by distillation and replaced by an equal volume of xylene. The resulting resinous product had the following properties:

| | |
|---|---|
| Solids (percent) | 48–52. |
| Weight per gallon | 8.0±0.1. |
| Viscosity (Gardner-Holdt) | U–W. |
| Color (Gardner 1933) | 5 (maximum). |
| Mineral spirits tolerance (cc. of naphtha per 100 grams of resin) | 75 (minimum). |

*Example II*

Eighty-five (85) parts of vinyl toluene, 15 parts of acrylamide, 1 part of cumene hydroperoxide and 1 part of tertiary dodecyl mercaptan were refluxed for 2 hours, and 0.5 part of additional cumene hydroperoxide was added. Refluxing was continued for a further period of 2 hours. The product was then admixed with a solution comprising 2 moles of formaldehyde (40 percent solution in butanol) and ⅓ part of maleic anhydride was added. The resulting mixture was then refluxed for 3 hours, after which the butyl alcohol was distilled to provide a produce having the following properties:

| | |
|---|---|
| Solids (percent) | 48–52. |
| Weight per gallon (pounds) | 7.9. |
| Viscosity (Gardner-Holdt) | X–Z. |
| Color | 8 (maximum). |
| Mineral spirits tolerance | 400 (minimum). |

*Example III*

This example illustrates the use of an unsaturated acid in the acrylamide interpolymerization to provide an internal catalyst which accelerates the cure of the coating composition. The interpolymer was prepared from the following components in the amounts set forth:

| | Parts by weight |
|---|---|
| Styrene | 39 |
| Ethyl acrylate | 44 |
| Acrylamide | 15 |
| Acrylic acid | 2 |
| Cumene hydroperoxide | 1 |
| Tertiary dodecyl mercaptan | 1 |

The above components were admixed and refluxed for 2 hours, after which an additional 0.5 part of cumene hydroperoxide was added and reflux was continued for a further period of 2 hours. A solution comprising 2 moles of formaldehyde (40 percent concentration in butanol) was added together with about 0.33 part of maleic anhydride catalyst. The resulting mixture was refluxed for 3 hours, after which one-half of the butyl alcohol was removed by distillation and replaced by an equal amount of xylene.

*Example IV*

An acrylamide interpolymer is prepared from the following components in the amounts set forth:

| | Parts by weight |
|---|---|
| Acrylamide | 90 |
| Styrene | 231 |
| Ethyl acrylate | 264 |
| Methacrylic acid | 15 |
| n-Butanol | 300 |
| Toluene | 300 |

The above components were mixed in a solution and refluxed in the presence of 9 parts cumene hydroperoxide and 9 parts tertiary dodecyl mercaptan for 2 hours at 210° C. to 215° C., after which were added 3 parts cumene hydroperoxide. The mixture was then refluxed for three successive 2-hour periods, after each of which were added 3 parts cumene hydroperoxide. After the second reflux period, 190.5 parts butyl Formcel and 2.6 parts maleic anhydride were also added. During the last two reflux periods, the formed water was removed by azeotropic distillation. The resulting resinous product was cooled to about 175° C. and was blended with 10 percent of an epoxy resin (epoxide equivalent 450–525) based on the weight of the total mixture. This blend was stirred until it was homogeneous and cooled. Results:

| | |
|---|---|
| Solids (percent) | 50 |
| Viscosity (Gardner-Holdt) | T–U |

*Example V*

Two hundred six and three-tenths (206.3) parts of styrene, 37.5 parts of acrylamide and 6.25 parts of methacrylic acid were admixed with 2.5 parts of tertiary dodecyl mercaptan (chain transfer agent), 125 parts of butanol, 125 parts of toluene, and 2.5 parts of cumene hydroperoxide. The resulting mixture was refluxed for 2 hours, after which an addiitonal 1.25 parts of cumene hydroperoxide were added. Refluxing was then continued for a further period of 2 hours, at which time a final addition of 1.25 parts of cumene hydroperoxide was made and refluxing continued until a conversion of substantially 100 percent was obtained. The resulting product was then admixed with 79.4 parts of a 40 percent solution of formaldehyde in butanol and 1 part of maleic anhydride catalyst. The resulting mixture was then refluxed under azetropic conditions for 3 hours to remove water of reaction. The resinous product had the following properties:

| | |
|---|---|
| Solids (percent) | 48–52 |
| Weight per gallon (pounds) | 8.07 |
| Viscosity (Gardner-Holdt) | V–Y |
| Color (Gardner) | Under 7 |
| Acid value | 5.5–7.5 |

*Example VI*

A pigment paste was made up as follows:

| | Parts by weight |
|---|---|
| Product of Example V | 50 |
| Cellosolve acetate | 30 |
| Titanium dioxide (rutile) pigment | 280 |

The above ingredients were charged into a pebble mill and ground for 16 hours, after which 40 more parts of the product of Example V were added and the mixture was ground until homogeneous. Two enamels were made up as follows:

| | Parts by Weight | |
|---|---|---|
| Above pigment paste | 420 | 420 |
| Product of Example V | 535 | 515 |
| Poly(alpha methyl)styrene (Dow resin 276-V-2) | ------ | 10 |
| Butyl carbitol | 33 | 33 |
| High boiling aromatic naphtha, B.P. in excess of 200° C. (Velsicol 45) | 15 | 15 |
| Xylene | 15 | 25 |
| Silicone oil (Linde R-12) (4% solution in xylene) 2% solids | 2 | 2 |

The above enamels were sprayed on steel panels and one sample of each was fired for 30 minutes at 350° F. The sample which was sprayed with the enamel containing poly(alpha methyl)styrene was smooth and free from solvent popping, while the sample which was sprayed with the sample not containing a poly(alpha methyl)styrene manifested severe blistering from the solvent popping.

*Example VII*

A pigment paste was made up as follows:

| | Parts by weight |
|---|---|
| Product of Example V | 40 |
| Pine oil | 29 |
| Velsicol 45 (high-boiling aromatic naphtha, boiling point in excess of 200° C.) | 20 |
| Titanium dioxide pigment (rutile) | 265 |

The above ingredients were charged into a pebble mill and ground for 16 hours, after which 45 more parts of the product of Example V were added and the mixture was ground until homogeneous. Two enamels were made up as follows:

| | Parts by Weight | |
|---|---|---|
| | A | B |
| Above prepared printing paste | 420 | 410 |
| Product of Example V | 535 | 420 |
| Poly(alpha methyl)styrene Dow resin 276-V-2 | ------ | 60 |
| Butyl carbitol | 33 | 15 |
| Hydrogenated aromatic solvents, B.P. in excess of 200° C. (Velsicol 45) | 15 | 105 |
| Xylene | 15 | 15 |
| Silicone oil (Linde R-12) (4% solution in xylene) 2% solids | 2 | 2 |

Two enamels were then sprayed onto phosphatized steel panels (Bronderite 1001) and baked for 30 minutes at 300° F. The panel which was sprayed with the enamel (A) not containing poly(alpha methyl)styrene manifested severe solvent popping, while the steel panel which was sprayed with the enamel (B) containing 60 parts of the said poly(alpha methyl)styrene was free from solvent popping. The films had the following properties:

Good adhesion at 90 inch-pounds reverse impact with ½" diameter ball.

| | |
|---|---|
| Mandrel (conical) | Excellent |
| Gloss (Gardner-Gloss 60°) | 74 |
| Pencil hardness | 3H |

*Example VIII*

A pigment paste was made up as follows:

| | Parts by weight |
|---|---|
| Product of Example VI | 45 |
| Xylene | 60 |
| Titanium dioxide pigment (rutile 193) | 80 |

The above ingredients were charged into a pebble mill and ground for 16 hours, after which 75 more parts of the product of Example VI were added and the mixture was ground until homogeneous.

Two enamels were made up as follows:

| | Parts by Weight | |
|---|---|---|
| Above pigment paste | 460 | 460 |
| Product of Example VI | 495 | 475 |
| Poly(alpha methyl)styrene (Dow resin 276-V-2) | ------ | 10 |
| A 1-16.7 Maskit-xylene solution | 15 | 15 |
| Silicone oil (Linde R-12) (4% solution in xylene) 2% solids | 2 | 2 |
| Pine oil | 10 | 10 |
| Butyl Cellosolve | 15 | 15 |
| Butanol | 13 | 15 |
| Xylene | ------ | 8 |

The above enamels were sprayed on steel panels and one sample of each was fired for 30 minutes at 350° F. The sample which was sprayed with the enamel containing poly(alpha methyl)styrene was smooth and free from solvent popping, while the sample which was sprayed with the enamel not containing the poly(aphya methyl)styrene manifested severe solvent popping as blistering.

I claim:

1. A heat-hardenable resinous composition comprising (1) a polymer of styrene comprising at least 90 percent of a monomer in polymerized form having the general formula

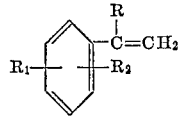

wherein R, $R_1$ and $R_2$ represent at least one member of the group consisting of hydrogen, methyl, ethyl, propyl and butyl radicals and (2) an interpolymer of an unsaturated carboxylic acid amide and at least one other monomer containing a $CH_2=C<$ group, said interpolymer containing from about 2 to about 50 percent by weight of said amide in polymerized form based on the total weight of said interpolymer, and being characterized by having at least one hydrogen atom of an amido nitrogen replaced by the structure:

wherein R is a member selected from the group consisting of hydrogen, furyl and lower alkyls, and $R_1$ is a member selected from the group consisting of hydrogen, lower alkyl and alkoxyethyl.

2. An article with its surface having as a coating thereon, a heat hardened film of the resinous composition of claim 1.

3. A heat hardenable, resinous composition of claim 1 wherein said polymer of styrene is present in amounts ranging from about 1 to about 20 percent of the total weight of said heat hardenable, resinous composition.

4. A heat hardenable, resinous composition of claim 3 wherein said polymer of styrene is comprised of poly(alpha methyl)styrene.

5. The heat hardenable composition of claim 3 wherein said polymer of styrene is comprised of polystyrene.

6. A heat hardenable, resinous composition of claim 3 wherein said polymer of styrene is comprised of polymethyl styrene.

7. The heat hardenable, resinous composition of claim 3 wherein said polymer of styrene is comprised of polydimethyl styrene.

8. The heat hardenable, resinous composition of claim 3 wherein said polymer of styrene is comprised of a copolymer of poly(alpha methyl)styrene with a monomer containing a $CH_2=C<$ group.

9. A heat hardenable, resinous composition comprising (A) an epoxy resin prepared from a polyglycidyl ether of a polyhydric compound and (B) the heat hardenable, resinous composition of claim 3.

10. An article with its surface having as a coating thereon, a heat hardened film of the resinous composition of claim 9.

11. The composition of claim 1 in which said unsaturated carboxylic acid amide is acrylamide.

12. The composition of claim 1 in which said polymer of styrene is a copolymer of said monomer with at least one other monomer having a $CH_2=C<$ group.

References Cited in the file of this patent

UNITED STATES PATENTS

| | | |
|---|---|---|
| 2,870,116 | Vogel et al. | Jan. 20, 1959 |
| 2,870,117 | Vogel et al. | Jan. 20, 1959 |
| 2,975,150 | Johnson et al. | Mar. 14, 1961 |
| 2,978,437 | Christenson | Apr. 4, 1961 |
| 3,011,993 | Kapalko et al. | Dec. 5, 1961 |
| 3,037,963 | Christenson | June 5, 1962 |

OTHER REFERENCES

Morrell: "Synthetic Resins and Allied Plastics," page 201, 1951, Oxford University Press, New York.